US008141233B2

(12) United States Patent  (10) Patent No.: US 8,141,233 B2
Malvestiti et al.  (45) Date of Patent: Mar. 27, 2012

(54) METHOD FOR MANUFACTURING A LAMINATION FOR ELECTRIC MOTOR ROTOR

(75) Inventors: Alberto Malvestiti, Cinisello Balsamo (IT); Claudio Malvestiti, Cinisello Balsamo (IT); Sergio Confalonieri, Cabiate (IT)

(73) Assignee: Ernesto Malvestiti S.p.A., Cinisello Balsamo (MI) (IT)

( * ) Notice: Subject to any disclaimer, the term of this patent is extended or adjusted under 35 U.S.C. 154(b) by 389 days.

(21) Appl. No.: 11/746,552

(22) Filed: May 9, 2007

(65) Prior Publication Data

US 2007/0267933 A1  Nov. 22, 2007

(30) Foreign Application Priority Data

May 19, 2006 (EP) .................................... 06010339

(51) Int. Cl.
*H02K 15/02* (2006.01)
*H02K 15/10* (2006.01)

(52) U.S. Cl. ......... 29/598; 29/592.1; 29/596; 310/261.1

(58) Field of Classification Search .................... 29/596, 29/598, 609; 310/217, 218, 261.1
See application file for complete search history.

(56) References Cited

U.S. PATENT DOCUMENTS

| 3,590,208 | A | | 6/1971 | Martini et al. | |
|---|---|---|---|---|---|
| 3,638,597 | A | * | 2/1972 | Brown | 29/509 |
| 4,341,966 | A | * | 7/1982 | Pangburn | 310/61 |
| 4,395,816 | A | * | 8/1983 | Pangburn | 29/598 |
| 6,094,125 | A | * | 7/2000 | Ito | 336/234 |
| 2002/0105245 | A1 | | 8/2002 | Park | |

FOREIGN PATENT DOCUMENTS

JP  56 025344 A  3/2011

* cited by examiner

*Primary Examiner* — Paul D Kim
(74) *Attorney, Agent, or Firm* — Hess Patent Law Firm PC; Robert J. Hess

(57) ABSTRACT

A method for manufacturing a lamination for electro motor rotors that have skew or helical slots by forming at least one boss on a face of the lamination and reducing a thickness of a first portion of the boss. The reduction in thickness may be by carrying out a localized narrowing of the thickness of the first portion and the boss may be manufactured by pressing the lamination. The localized narrowing may be carried out by misalignment of a die relative to a punch within a mould.

18 Claims, 1 Drawing Sheet

METHOD FOR MANUFACTURING A LAMINATION FOR ELECTRIC MOTOR ROTOR

BACKGROUND OF THE INVENTION

1. Field of the Invention

The present invention relates to a lamination for electric motors and a method for making this lamination and coupling more laminations to each other.

2. Discussion of Related Art

The stators and rotors of several types of electric motors are made by packing a plurality of suitably shaped laminations made of ferromagnetic material. The individual laminations are generally obtained from metal laminates that are subjected to pressing and punching processes.

The thus-obtained laminations are coupled to each other; in particular, they are stacked to form the core of a rotor or to form a stator. Each lamination is provided with slots, which along with the slots of the other laminations define the slots suitable to house the stator/rotor windings or the melt material alternatively used (generally die-cast aluminium).

The laminations used for making rotors of electric motors can be coupled such that the rotor has straight or skew slots, such as having a helical development. In other words, the laminations can be stacked on each other without offset, such that the slots for the windings are overlapped to form a straight slot, or with an angular offset, such that the slots of a first lamination result to be rotated relative to the matching slots of a second lamination adjacent thereto, in order to form a slot for the winding which is either skew or helical.

The laminations are coupled to form a pack having the desired height, corresponding to the height of the rotor or stator of the electric motor to be made. Regardless of the slot shape, when the pack is made up of a large number of laminations, any difference in the thickness that can be found between the different portions of the laminations can lead to inaccurate assembly. For those packs made up of a large number of laminations, for example more than 100, a "compensation" may be required during the manufacturing step. The compensation is carried out by stacking the laminations such that the pack mass is evenly distributed relative to the axis thereof. For example, the rotors or stators are "compensated" by packing each lamination offset by a preset angle, such as 90° relative to the adjoining lamination (and this is provided for all the laminations in the pack) such that any non-uniformity of the individual lamination is evenly distributed relative to the axis of rotation of the lamination pack (rotor axis).

The coupling between the laminations is generally obtained by providing each lamination with one or more bosses, which can be, in turn, provided with a relief hole. The bosses are projections of the lamination, which are obtained during the pressing step, which branch off from one of the two faces thereof and develop along an arc of circle between two ends. The (through) relief holes, which are also obtained by means of punching, are formed at an end of the relative boss.

In a lamination for stators, the bosses are not provided with a relief hole and the ends of each bosses are integral with the lamination. The bosses have the function of engaging the corresponding bosses of a second adjoining lamination.

In a lamination for rotors, each boss is provided with a matching relief hole. At this hole, the end of the boss is separated from the lamination and remains free. The relief hole allows creating a sufficient space for inserting the free end of a matching boss of a second lamination, when the laminations are stacked in an offset manner in order to obtain skew slots. The laminations being at the one end of the pack, i.e. the first one, or the first laminations in the pack, are usually not provided with bosses and are called the separating laminations.

The coupling between the matching bosses of adjoining laminations is of a forced type (at the side edges of the bosses). The drawbacks of the traditional laminations are generally connected with the boss-boss coupling, particularly when the laminations are coupled in an offset manner. As the height of the lamination pack increases, i.e. when the number of coupled laminations increases, the offset angle between two adjoining laminations is small. The interference that is likely to occur between the ends of the coupled bosses can affect the evenness of the offset angle along the pack. In other words, the bosses being coupled can interfere at the ends, thus actually changing the preset offset angle.

This problem is particularly important when the laminations are coupled in order to make rotors with skew or helical slots. The offset angle between adjoining laminations has to be even along the rotor as much as possible. On the other hand, the least variation in this angle leads to slots having a development in the space that deviates from the desired trend. The filling material of the rotor slots, such as aluminium, is arranged in the relative slot by following the development thereof. The displacements of the slots, and thus of the aluminium cage housed therein, from the desired skew or predetermined helical development cause the variation of the electrical characteristics of the relative electric motor.

In other words, in packs consisting of a large number of laminations, which are used to provide long rotors with skew or helical slots, laminations with an even offset angle are particularly difficult to couple. As the number of laminations increases in the pack, the offset angle between two adjoining laminations must be reduced. When an offset angle of a few degrees or fractions of degree must be adopted, any interference between the ends of the coupled bosses can easily cause sensible displacements of the offset angle from the desired value.

The manufacturers of laminations for electric motors and machines for manufacturing the same have been attempting for some time to develop a method for providing laminations that can be more precisely packed than traditional laminations.

Alternatively to the method described above for coupling laminations, a system has been proposed which provides using bosses and coupling holes.

For example, the European Patent Application EP-A-0847109, in the name of CORRADA S.p.A., describes a lamination provided with bosses and coupling holes being arranged along the circumference thereof. The distance between the bosses and holes is selected such that the laminations can be stacked by providing an offset angle between each lamination. Thereby, besides being able of providing rotors with both straight and skew slots, compensation also requires to be carried out.

A drawback with the lamination provided according to the European Patent Application EP-A-0847109 is the requirement of making the coupling holes for the bosses. With this processing, one is forced to carried out the compensation of the pack. Furthermore, because of the requirement of making the coupling holes, the ferromagnetic material is reduced in the rotor made with the laminations.

It would be desirable is to provide a lamination for electric motors and a method for making the same, which overcomes the drawbacks of the traditional laminations in a simple and effective manner.

It would also be desirable to provide a lamination for electric motors, which can be easily packed, though it is not provided with coupling holes or boss relief holes.

It would be further desirable to provide a lamination for electric motors, which can be easily packed with the maximum precision of positioning and maximum stability.

It would be desirable to provide a method for making laminations for rotors of electric motors with skew (or helical) slots, which are easy to couple with the maximum precision and effectiveness.

SUMMARY OF THE INVENTION

Each of these desirable features are preferably attained by the present invention, which relates to a stackable lamination for rotors of electric motors with skew or helical slots, comprising at least one boss projecting from a face of the lamination for coupling to a second lamination, the two coupled laminations being rotated according to an offset angle, characterized in that a first portion of said boss has a lower thickness than the remaining portions to allow the offset coupling of the boss with a matching boss of said second lamination.

Advantageously, the lamination according to the present invention is not provided with either coupling holes or relief holes. The bosses of a lamination engage the matching bosses of another lamination, without requiring said coupling holes to be provided. The reduction in the thickness of an end of the bosses, relative to the remaining portions, allows coupling the laminations with the preset offset angle, without requiring the bosses to be provided with a relief hole. It should be understood that the lamination according to the invention allows maximizing the mass of ferromagnetic material of the lamination pack (because the removal of material for the coupling holes or relief holes is not contemplated).

The lamination according to the present invention is preferably provided with a plurality of bosses. The lamination can be stacked, i.e. coupled with other identical laminations to form a pack of laminations, by simply engaging each boss in a matching boss of the adjoining lamination in the same pack. In other words, the bosses of a first lamination can be fitted in the bosses of a second lamination (in order to engage a third lamination, when required).

The adjoining laminations are angularly offset, i.e. between the two coupled laminations there is defined an offset, that is characteristic of the skew of the slots of the rotor of the electric motor formed with the lamination pack.

Each boss extends along a tract of circumference about the axis of rotation of the lamination. Preferably, the boss has, in the longitudinal section thereof, a U-shaped (or V-shaped) profile. A first end of the boss that matches a skew tract of the U, has a lower section than the second end matching the remaining tract of the U.

When two bosses are coupled to each other, these bosses are moved closer to each other at their first end (having a lower thickness) and possibly at the lower portion of the U, whereas they are moved away from each other at their second end (having the same thickness as the boss). The result of this coupling is that two coupled bosses are offset relative to each other, i.e. the two bosses are rotated relative to the common axis of rotation of the matching laminations.

The rotation space of the adjacent laminations is thus obtained by carrying out a controlled reduction in the thickness of the material of the bosses at a first end thereof (or first skew side of the U). The bosses are preferably obtained from the lamination during the pressing step and said thickness reduction is carried out by causing a controlled necking at an end of each boss.

The present invention further relates to a method for making a lamination for rotors of electric motors with skew or helical slots, comprising the step of forming at least one boss on a face of the lamination, characterized in that it comprises the step of reducing the thickness of a portion of said boss.

The thickness reduction, which is locally provided on a boss portion, is carried out during the manufacturing step of the lamination by providing an offset between the punch die and the relative punch (punch and die are misaligned to carry out the necking on the first portion of the boss).

The lamination according to the present invention can be stacked in a very easy and effective manner, simply by forcing the bosses of a lamination in the concave portion of the matching bosses of another lamination.

The laminations are identical and are not provided with coupling holes for the bosses. This characteristic has important positive effects on the effectiveness of the motor made with the laminations, as the mass of ferromagnetic material is maximized.

The hold of the boss-boss coupling in the lamination according to the present invention is stronger than the hold of the boss-hole coupling (coupling or relief hole of another boss) typical of the traditional laminations. The laminations according to the present invention preferably are not provided with either coupling holes or relief holes.

The bosses of the lamination according to the invention can be easily made in a short time with the typical tolerances of a pressing process. The reduction in the section of a boss portion allows creating enough space for the offset coupling of the laminations. The offset angle is thus substantially even also with packs made up of a large number of laminations.

BRIEF DESCRIPTION OF THE DRAWING

Further aspects and the advantages of the present invention will be better understood from the description below, which is to be considered by way of a non-limiting example with reference to the annexed figures, in which.

DETAILED DESCRIPTION OF THE INVENTION

Figure 1:
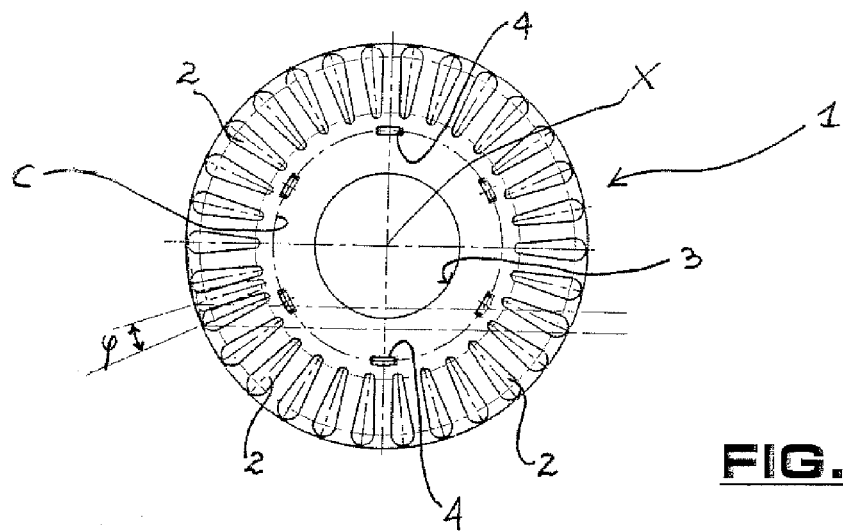
FIG. 1 is a plan view of a lamination according to the present invention.

With reference to FIG. 1, a lamination 1 is shown according to the present invention. The lamination 1 can be stacked to form a lamination pack used for making rotors of electric motors. The lamination 1 has a substantially circular shape, and is symmetrical relative to the axis of rotation X. A hole 3 is provided in the middle portion of the lamination 1 to allow for coupling to a shaft.

The lamination 1 is provided with a plurality of slots 2 that are intended to form, along with the slots 2 of the other laminations 1 in the same pack, the slots for housing the rotor windings. Particularly, the rotor slots are either skew slots, or have a helical development. When the laminations 1 have been stacked, the slots are filled with a molten material, generally (die-cast) aluminium.

The laminations 1 are stacked with an angular offset being provided between two adjoining laminations 1. In other words, in order to obtain skew or helical slots, the slots 2 of a first lamination are required to be angularly offset relative to the matching slots 2 of a second lamination adjacent to the first one. The skew of the slots (or the helical development thereof) in the lamination pack 1 depends on the offset angle between two adjoining laminations 1. The offset angle is indicated in FIG. 1 with the Greek letter φ with reference to a slot 2 and the matching slot 2' (dotted line) of a lamination 1' laying below the lamination 1.

The offset angle φ between two adjacent laminations is usually of a few degrees or hundredths of degree, for example, it ranges between 0.01° and 3°, when the pack is made up of a large number of laminations and is more than 100 mm long. When the number of laminations 1 making up a pack is reduced, the offset angle φ can have a higher value.

The coupling between the laminations 1 is obtained by providing each lamination 1 with a plurality of bosses 4. The bosses 4 are projections branching off from a face of the lamination 1. These projections are obtained from the solid part of the lamination 1, for example during the process of pressing the lamination 1, by locally deforming the lamination material.

For clarity purposes, reference will be made herein below to the coupling between a first lamination 1 provided with bosses 4 and a second lamination 1' provided with bosses 4'. Those skilled in the art will appreciate that the laminations 1,1', etc. in a same lamination pack are identical to each other.

Figure 2:
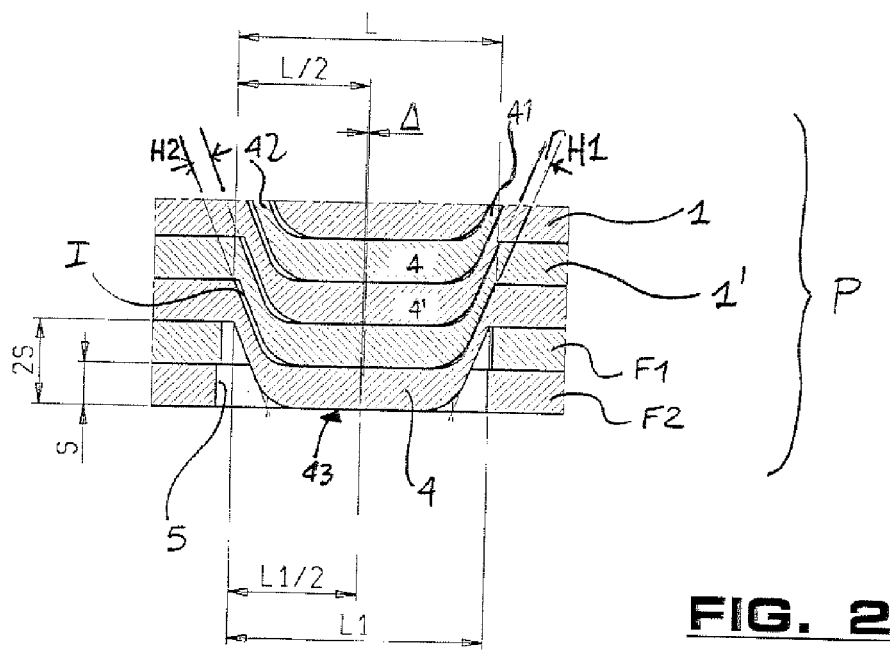
FIG. 2 is a circumferential sectional view of a detail of the lamination shown in FIG. 1.

FIG. 2 is a sectional view along the circumference C shown in FIG. 1 of a plurality of coupled laminations.

The lamination 1 according to the present invention can be coupled with another lamination 1' of the same type by means of the bosses 4. Advantageously, coupling holes or relief holes are not provided (except for separating laminations). The bosses 4 of the lamination 1 are forced into the bosses 4' of the lamination 1'. Particularly, FIG. 2 is a sectional view of the coupling of the matching bosses 4 and 4'. The laminations F1 and F2 are separating laminations, i.e. laminations which are positioned at an end of the pack, not provided with bosses 4, but provided with through holes 5 for housing the bosses 4, 4'. The laminations F1 and F2 shown in FIG. 2 are two lower laminations in the lamination pack P (the laminations above the lamination 1 are not shown).

Figure 3:
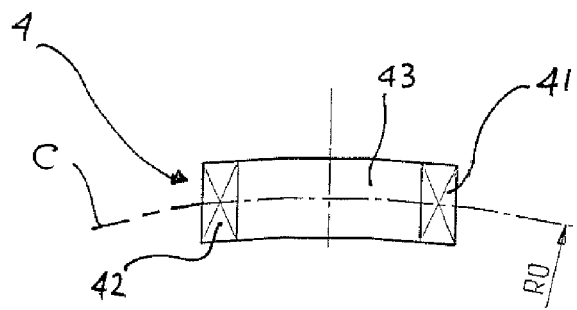
FIG. 3 is a top view of a detail of the lamination shown in FIG. 1.

The bosses 4, 4' have, in section, a U-shaped (or V-shaped) profile and develop along the circumference C between a first end 41 and a second end 42 (in section, they have a length L). Practically, each boss 4, 4' is obtained by locally deforming the relative lamination 1 or 1'. FIG. 3 shows a boss 4 as seen from above: it develops along an arc of circle having a curvature radius $R_0$. The lower portion 43 of boss 4 substantially has the same thickness S of the relative lamination 1, whereas the first end 41 and second end 42 have different thicknesses H1 and H2.

Advantageously, the laminations 1 can be stacked with the desired offset angle φ simply by coupling the corresponding bosses 4, 4', without the need of providing coupling holes or relief holes in each lamination. The convex portion of a boss 4 can be fitted in the concave portion of the matching boss 4'.

The first end 41 of each boss 4 or 4' has a lower thickness H1 than the second end 42 (which has thickness H2). Thereby, the boss 4 and the matching boss 4' (FIG. 2) can be coupled with an offset Δ (for example 0.04 mm), as considered along the circumference C, linked to the offset angle φ (for example, of 1°). In practice, the offset Δ is allowed by the decrease in the thickness of the first end 41.

By performing a controlled necking of the first end 41 of each boss 4 of the lamination 1, the bosses 4 and 4' can be coupled as to be angularly offset relative to the axis X, according to the desired offset angle φ. The bosses 4, and 4' remain close to each other at the first end 41 thereof, whereas they diverge at the respective second ends 42 thereof. The boss 4 moves towards a closer position to the corresponding coupling boss 4' at said first portion (41) having a reduced thickness, while remaining away at the second end (42) or at a remaining skew tract of a U-shaped profile.

The thickness reduction of the boss 4 at the first end 41 thereof can be provided during the manufacturing step of the lamination 1, for example during the pressing step, by providing a corresponding misalignment of the die relative to the relative punch within the mould. The bosses 4 are not provided either with the coupling holes or relief holes, unlike with traditional laminations. The lamination 1 is thus easier to manufacture as compared with the traditional laminations and can be more easily stacked.

The offset angle φ between the stacked laminations 1 is substantially even along the pack. As said above, the thickness reduction of the first end 41 of the bosses 4 can be carried out with such tolerances as to allow the laminations 1 to be coupled with a greater positioning accuracy as compared with what is provided in the prior art.

As the lamination 1 does not require coupling holes or relief holes for the bosses 4, the mass of ferromagnetic material of the stators and rotors made by stacking the laminations 1 is thus maximized.

What is claimed is:

1. A method of manufacture of electric motor rotors or stators having skew or helical slots, comprising the steps of: misaligning a punch and a die to provide an offset between the punch and the die; performing pressing and punching processes with the misaligned punch and die including pressing a lamination and locally deforming the lamination during the pressing to form at least one boss having a localized narrowed portion that is smaller in thickness than thicknesses of remaining portions of the lamination, the localized narrowed portion and one of the remaining portions each projecting from respective opposite ends of a further of the remaining portions; and configuring the at least one boss to fit into a matching boss of a second lamination to provide two coupled bosses, the two coupled bosses being closer to each other at said localized narrowed.

2. The method according to claim 1, characterized in that the at least one boss develops along an arc of circle about an axis of rotation of said lamination and the localized narrowed portion is formed by operating a necking at one end of the at least one boss.

3. The method according to claim 1, characterized by configuring and arranging the at least one boss to only couple with a corresponding boss of a second lamination.

4. The method according to claim 1, further comprising coupling the at least one boss from the face of the lamination to a second lamination so there are two coupled laminations; rotating the two coupled laminations according to an offset angle; and offset coupling the at least one boss with a matching boss of said second lamination.

5. The method according to claim 4, characterized by spacing a plurality of bosses that include the at least one boss along a same circumference and fitting each in the matching boss of said second lamination.

6. The method according to claim 4 or claim 5, characterized in the at least one boss having a convex portion of a U-shaped profile in a longitudinal section fitted in a concave portion of the matching boss of said second lamination.

7. The method according to claim 6, further comprising forming said localized narrowed portion with a reduced thickness at an inclined tract of the U-shaped profile.

8. The method according to claim 7, further comprising moving the at least one boss towards a closer position to the corresponding coupling boss at said localized narrowed portion while remaining away at said second end.

9. The method according to claim 7, further comprising moving the at least one boss towards a closer position to the corresponding coupling boss at said localized narrowed portion having a reduced thickness, while remaining away at a remaining skew tract of the U-shaped profile.

10. The method according to claim 4, further comprising extending the at least one boss over an arc of a circle, between a first end and a second end, away from an axis of the lamination.

11. The method according to claim 10, characterized by providing said localized narrowed portion at the first end of the at least one boss.

12. The method according to claim 1, wherein the lamination has a face that extends in plane along the further of the remaining portions, both the localized narrowed portion and the one of the remaining portions extending out of the plane from the respective opposite ends of the further of the remaining portions.

13. The method according to claim 1, wherein the lamination has no coupling holes and has no boss relief holes.

14. The method according to claim 1, wherein the localized narrowed portion and the one of the remaining portions collectively provide a U or V shape profile.

15. A method of manufacture of an electric motor rotor or stator having skew or helical slots, comprising: misaligning a punch and a die to provide an offset between the punch and the die; performing pressing and punching processes with the misaligned punch and die; subjecting individual metal laminates to the pressing and punching processes to form laminations made of ferromagnetic material; packing a plurality of the laminations into stacks to constitute a core of the electric motor rotor or stator, each of the laminations having slots collectively suited to house skew or helical windings; locally deforming the laminations during the pressing with the misaligned punch and die to form bosses that project from associated ones of the laminations; and adjoining ones of the laminations having matching ones of the bosses that fit one in another, the bosses each having a localized narrowed portion that is smaller in thickness than remaining portions of associated ones of the laminations, the localized narrowed portion being smaller in thickness than thicknesses of the remaining portions, the localized narrowed portion and one of the remaining portions each projecting outwardly from respective opposite ends of a further of the remaining portions, the bosses each branching off from associated ones of the laminations.

16. The method according to claim 15, wherein each of the laminations has a respective face, one of the respective faces extending in plane along the further of the remaining portions, both the localized narrowed portion and the one of the remaining portions extending out of the plane from the respective opposite ends of the further of the remaining portions.

17. The method according to claim 15, wherein each of the laminations has no coupling holes and has no boss relief holes.

18. The method according to claim 15, wherein the localized narrowed portion and the one of the remaining portions collectively provide a U or V shape profile.

\* \* \* \* \*